United States Patent

Bond et al.

Patent Number: 5,903,483
Date of Patent: May 11, 1999

[54] FREQUENCY DOMAIN KERNEL PROCESSOR

[75] Inventors: James W. Bond, San Diego; Stefen Hui, Spring Valley; David Stein; James Zeidler, both of San Diego, all of Calif.

[73] Assignee: The United States of America as represented by the Secretary of the Navy, Washington, D.C.

[21] Appl. No.: 08/909,748

[22] Filed: Aug. 12, 1997

[51] Int. Cl.[6] .................................................... G06F 15/00
[52] U.S. Cl. ...................................................... 364/726.01
[58] Field of Search ....................... 364/725.01, 725.02, 364/726.01, 726.02, 726.03, 726.04, 726.05, 726.06, 726.07; 702/77

[56] References Cited

U.S. PATENT DOCUMENTS

| | | | |
|---|---|---|---|
| 4,730,257 | 3/1988 | Szeto | 702/77 |
| 4,894,795 | 1/1990 | Whitehouse et al. | 364/807 |
| 4,901,244 | 2/1990 | Szeto | 702/77 |
| 5,018,088 | 5/1991 | Higbie | 702/194 |
| 5,034,910 | 7/1991 | Whelchel et al. | 364/726.05 |
| 5,283,900 | 2/1994 | Frankel et al. | 395/670 |
| 5,289,194 | 2/1994 | Schlosser | 342/378 |

*Primary Examiner*—Chuong Dinh Ngo
*Attorney, Agent, or Firm*—Harvey Fendelman; Michael A. Kagan; Eric James Whitesell

[57] ABSTRACT

The frequency domain kernel processor of the present invention comprises a scheduler for selecting samples from blocks of Fourier transform coefficients in a predetermined sequence and for outputting the selected samples as serial terms s and as parallel terms u. A transform processor is coupled to the scheduler to receive the terms s and u. The transform processor comprises transform calculators for calculating output values p and f as functions of terms s and u to model the interference and to reveal the desired signal, a first sum calculator for calculating a sum of p values, a second summing calculator for calculating a sum of f values, and a divider for calculating, the quotient of the sum of p values divided by the sum of f values. An output buffer stores the outputs of the divider for formatting as a spectral display.

7 Claims, 6 Drawing Sheets

FREQUENCY DOMAIN KERNEL PROCESSOR

The invention described below is assigned to the United States Government and is available for licensing commercially Technical and licensing inquiries may be directed to Harvey Fendelman, Legal Counsel For Patents, NCCOSC RDTE DIV CODE 0012, 53510 Silvergate Avenue Room 103, San Diego, Calif. 92152-5765; telephone no. (619)553-3818; fax no. (619)553-3821.

BACKGROUND OF THE INVENTION

The frequency domain kernel processor of the present invention relates generally to enhancing the signal-to-noise ratio of communication signals More particularly, the present invention relates to detecting weak signals in the presence of interfering signals having signal power that varies with time.

Electrical signals having sharp spectral features have traditionally been detected by signal processors exemplified by signal processing system 100 in the block diagram of FIG. 1. A sensor 102 outputs an electrical signal representative of the desired signal typically masked by interfering signals. An A/D converter 104 digitizes the electrical signal and outputs a data stream to Fourier transform 106. Format processor 108 averages the Fourier coefficients generated by Fourier transform 108 and displays the average power over time per frequency bin on display 110. If the desired signal is masked by interfering signals spanning the frequencies of the desired signal, however, the spectral characteristics of the desired signal may not be apparent. A continuing need exists for a signal processing system for displaying weaker signals that are masked by stronger interfering signals.

SUMMARY OF THE INVENTION

The frequency domain kernel processor of the present invention addresses the problems described above and may provide further related advantages.

The frequency domain kernel processor of the present invention comprises an input buffer to store Fourier coefficients input from a Fourier transform of a communications signal. A communications signal suitable for processing by the present invention typically comprises a desired target signal masked by a stronger interference signal having varying power that spans a range of frequency bins encompassing the target signal. A scheduler inputs the Fourier transform coefficients from the input buffer and generates a series of magnitude squares for each frequency bin for a predetermined sequence of selected samples and outputs the selected samples as serial terms s and as parallel terms u. A transform processor coupled to the scheduler receives the terms s and u and calculates output values p and f as functions of terms s and u to model the interference and to reveal the desired signal An output buffer stores the transformed outputs from the transform processor to be formatted and displayed on a spectral display.

Other objects, advantages and new features of the invention will become apparent from the following detailed description of the invention when considered in conjunction with the accompanying drawings.

DESCRIPTION OF THE INVENTION

A frequency domain kernel processor of the present invention may be used with a sensor having an electrical output signal that includes a signal of interest such that the signal of interest contributes to at most two adjacent frequency bins, while strong interfering signals are preferably broader so as to contribute to at least four adjacent frequency bins including those encompassing the signal of interest. The interfering signals should also have signal power that varies slowly over time. An example of an interfering signal to which the present invention applies is a multipath signal that periodically fades and increases in signal strength.

Figure 1:
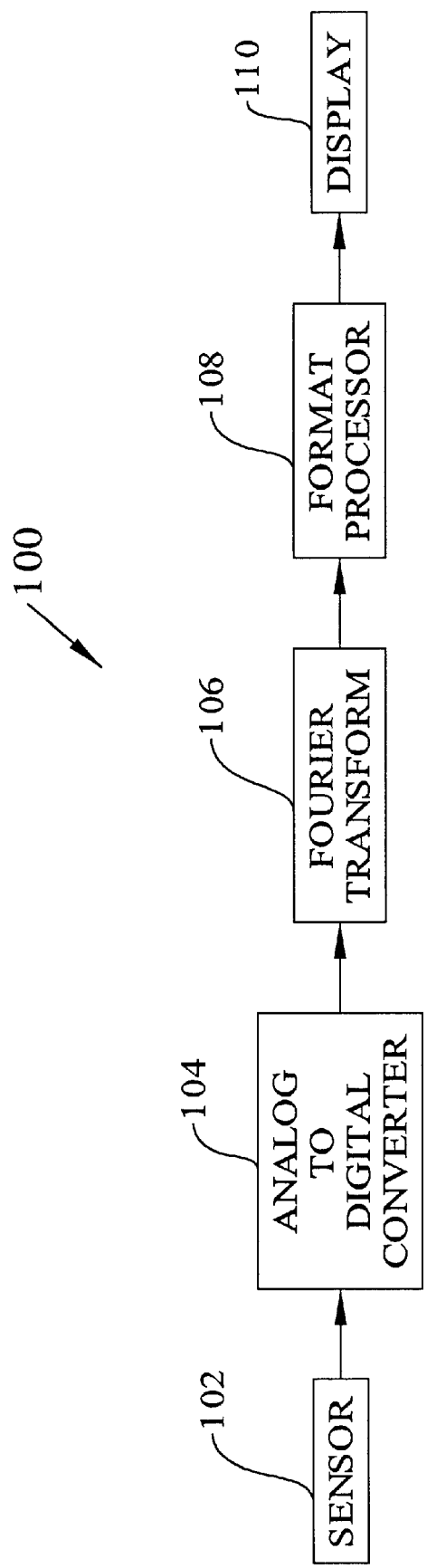
FIG. 1 is a block diagram of a typical signal processing system of the prior art.
Figure 2:
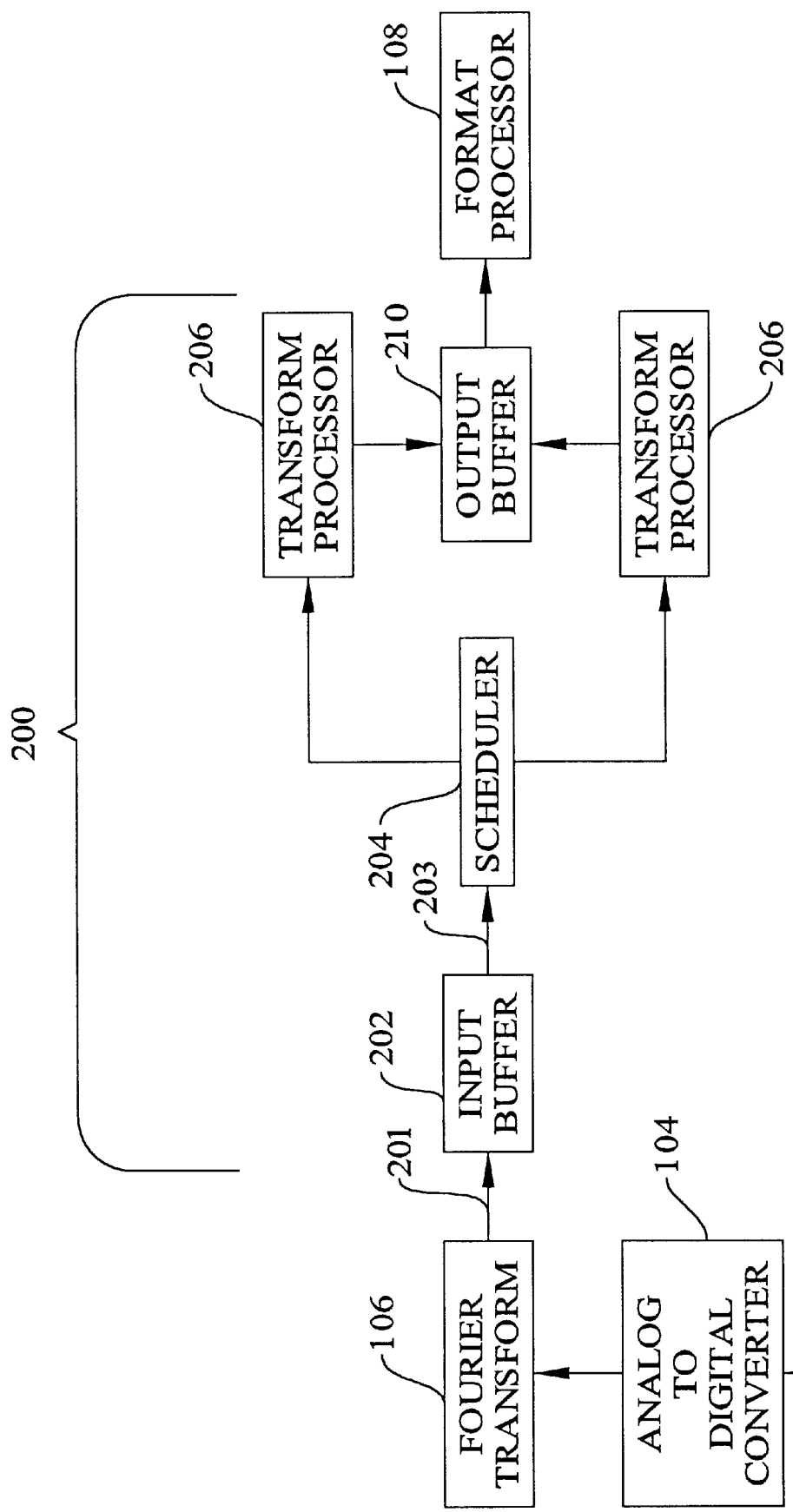
FIG. 2 is a block diagram of the frequency domain kernel processor of the present invention.

FIG. 2 is a block diagram of an embodiment of a frequency domain kernel processor 200 inserted into signal processing system 100 of FIG. 1 between Fourier transform 106 and format processor 108. Frequency domain kernel processor 200 comprises an input buffer 202, a scheduler 204, two transform processors 206, and an output buffer 210. Input buffer 202 receives blocks of Fourier coefficients representative of a communications signal 201 from Fourier transform 106. Commununications signal 201 typically includes an interfering signal that prevents recovery of information from the signal of interest. Scheduler 204 forms squared magnitudes of the Fourier coefficients obtained from transforming successive blocks of samples output from sensor 102. Scheduler 204 then switches the squared magnitudes in a selected sequence to transform calculators 206. Transform calculators 206 calculate the kernel transform of the squared magnitudes of adjacent frequency bins to reveal the desired signal Output buffer 210 buffers the output of transform calculators 206 for input to format processor 108.

Figure 3:
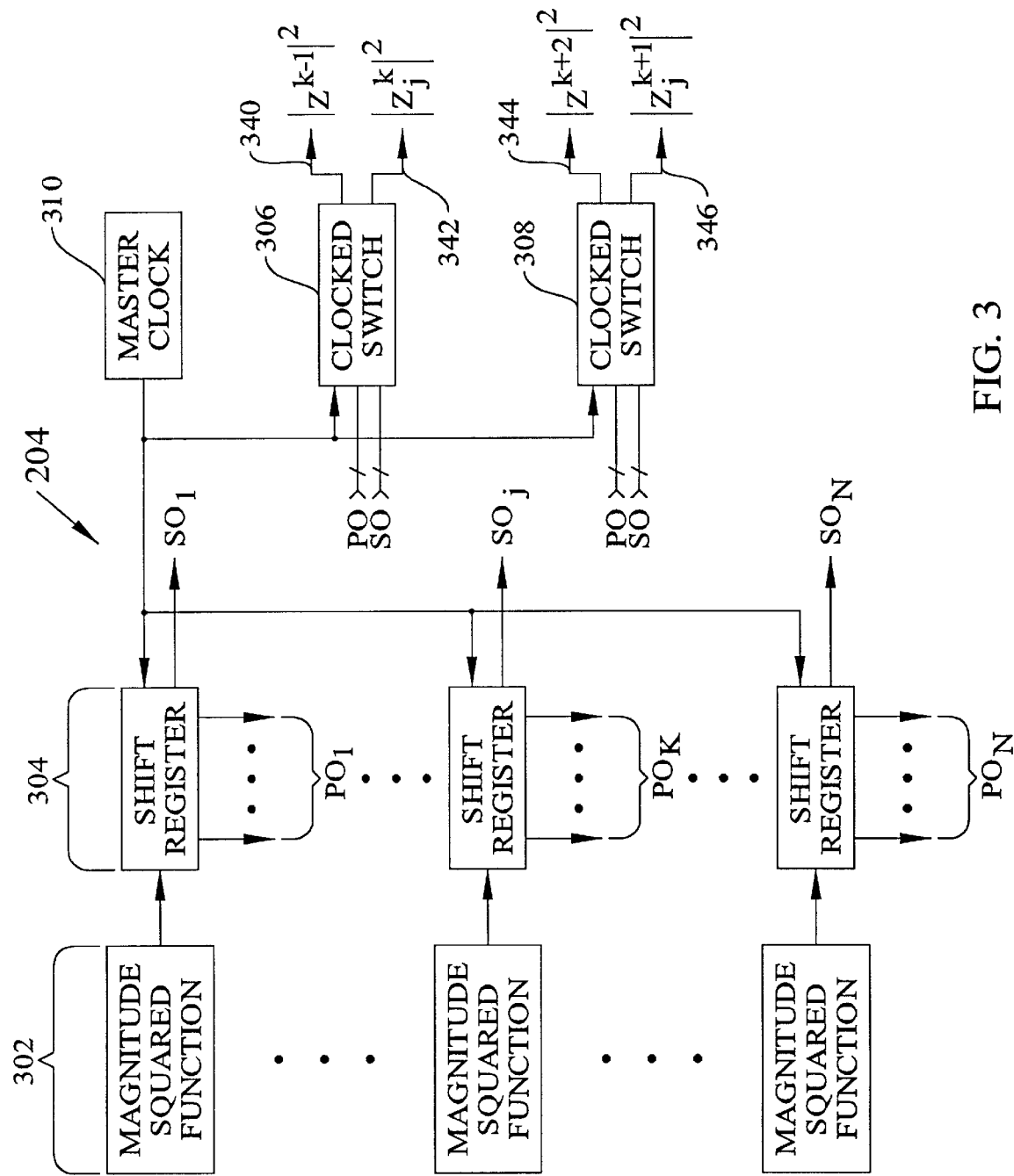
FIG. 3 is a detailed diagram of a scheduler of the frequency domain kernel processor.

FIG. 3 shows the detailed structure of scheduler 204. Buffered Fourier coefficients 203 of input signal 201 are distributed in parallel to magnitude squarers 302. By way of example, magnitude squarers 302 may be a pair of multipliers for squaring the real and imaginary parts of each coefficient and a sum function to add the squares of the real and imaginary parts of complex Fourier coefficients 203. Magnitude squarers 302 output the squared magnitudes of the Fourier coefficients of each frequency bin to shift registers 304. Interference clocked switch 306 selects one of shift register parallel outputs PO and corresponding serial outputs SO in the sequence (j=1) and (j=4), (j=2) and (j=5), . . . j and (j+3), N−3 and N, while signal clocked switch 308 selects one of shift register parallel outputs PO and corresponding serial outputs SO in the sequence (j=2) and (j=3), (j=3) and (j=4) , . . . , (j+1) and (j+2), (N−2) and (N−1). Clocked switches 306 and 308 are controlled by a master clock signal 310 to select the outputs of shift registers 304 in a cycle ranging from the earliest squared magnitude to the latest. Shift register parallel outputs 340 and 344 and shift register serial outputs 342 and 346 selected by clocked switches 306 and 308 are output respectively to transform processors 206.

In operation, scheduler 204 models the interference using, for example, 16 samples. Fourier transform blocks typically have a length of $2^N$ samples, so that N=4 in this example. 16 samples taken at time increments 1 through 9 in this example are stored in input buffer 202 as a column of Fourier coefficients $z_1^1, z_1^2, \ldots, Z_1^{16}$. Buffered Fourier coefficients 203 are calculated from blocks of 16 successive time samples digitized from sensor 102. Fourier coefficients 203 denoted by $z_j^k$ are defined mathematically as:

$$z_j^k = \sum_{m=1}^{16} r_j^{m-1} \left[ \cos 2\pi \frac{(m-1)(k-1)}{16} + i\sin\frac{(m-1)(k-1)}{16} \right],$$

where $r_j^m$ represents a time sample at time j within a block m. Next, a second column of Fourier coefficients $z_2^1, z_2^2, \ldots, z_2^{16}$ is stored in input buffer 202 and so on until $2^{N-1}+1=9$ columns are stored. The contents of input buffer 202 are then shifted through magnitude square generators 302 and into shift registers 304. The contents of shift registers 304 form the matrix $$\begin{bmatrix} |z_9^1|^2 & |z_8^1|^2 & |z_7^1|^2 & |z_6^1|^2 & |z_5^1|^2 & |z_4^1|^2 & |z_3^1|^2 & |z_2^1|^2 & |z_1^1|^2 \\ |z_9^2|^2 & |z_8^2|^2 & |z_7^2|^2 & |z_6^2|^2 & |z_5^2|^2 & |z_4^2|^2 & |z_3^2|^2 & |z_2^2|^2 & |z_1^2|^2 \\ \vdots & \vdots & \vdots & \vdots & \vdots & \vdots & \vdots & \vdots & \vdots \\ |z_9^{16}|^2 & |z_8^{16}|^2 & |z_7^{16}|^2 & |z_6^{16}|^2 & |z_5^{16}|^2 & |z_4^{16}|^2 & |z_3^{16}|^2 & |z_2^{16}|^2 & |z_1^{16}|^2 \end{bmatrix}$$

The first kernel transform calculation is performed by switching squared magnitudes $|Z^{k-1}|^2$ and $|Z^{k+2}|^2$ from parallel outputs and $|Z_j^k|^2$ and $|Z_j^{k+1}|^2$ from series outputs of shift registers 304 respectively from first and fourth shift registers 304 to transform the time sample data in second and third shift registers 304. Kernel transform processors 206 perform the kernel transforms for successive time increments from second and third shift registers 304 respectively using the same data in first and fourth shift registers 304. Note that the data in the first and last shift registers is not transformed.

The second calculation performs kernel transforms for third and fourth shift registers 304 using the data in second and fifth shift registers 304, and so on until the last calculation performs the kernel transforms for 14th and 15th shift registers using the data in thirteenth and sixteenth shift registers 304. After this calculation the data for time samples 10 through 18 is shifted into shift registers 304 and processed in the same manner as for time samples 1 through 9.

Figure 4:
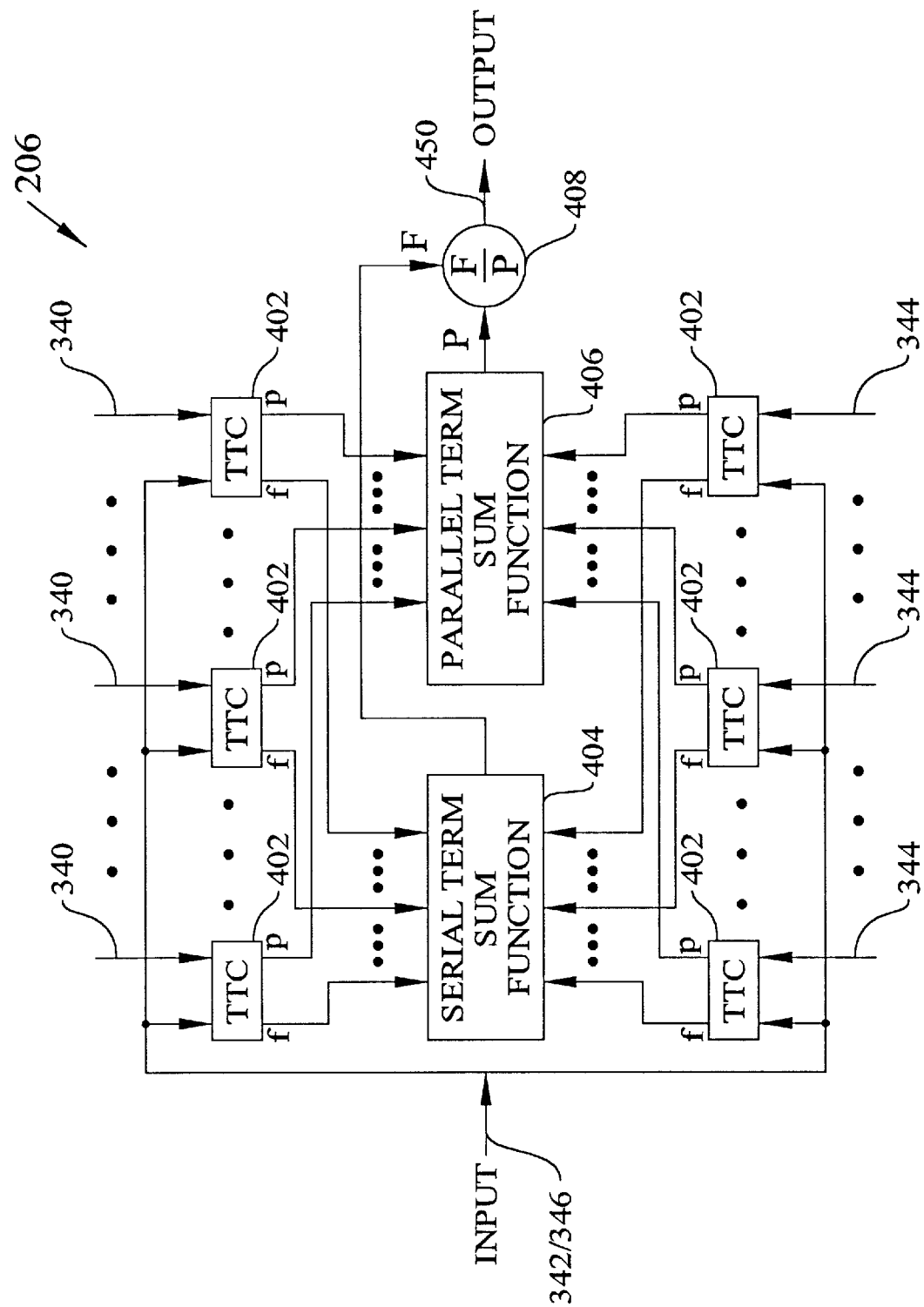
FIG. 4 is a detailed diagram of a kernel transform processor of the frequency domain kernel processor.

FIG. 4 shows the detailed structure of each kernel transform processor 206. Each of kernel transform processors 206 comprises transform term calculators 402, summing functions 404 and 406, and a divider 408 for calculating the kernel transforms of the squared magnitudes. One of transform processors 206 calculates kernel transforms for serial term $|z_j^k|^2$ outputs from clocked switch 306, and the other calculates kernel transforms for serial term $|z_j^{k+1}|^2$ outputs from clocked switch 308 for every time index j. The first step in calculating the kernel transforms is performed by transform term calculators 402. Each transform term calculator 402 inputs serial term 342 or 346 denoted by the symbol "s" and a parallel term 340 or 344 denoted by the symbol "u" from clocked switches 306 and 308 respectively. For each parallel term u, transform calculators 402 output the functions f and p defined by $$f(u,s) = \left[ \frac{s}{u^2} - \frac{2}{u} \right] \frac{1}{u} e^{-\frac{s}{2u}}$$

and $$p(u,s) = \frac{1}{u} e^{-\frac{s}{2u}}$$

Summing functions 404 and 406 total the values of f and p respectively from transform calculators 402 and outputs the totals to a divider 408. Divider 408 divides serial term sum F by parallel term sum P to obtain the normalized variable $\frac{F}{P}$ for output to output buffer 210.

Figure 5:
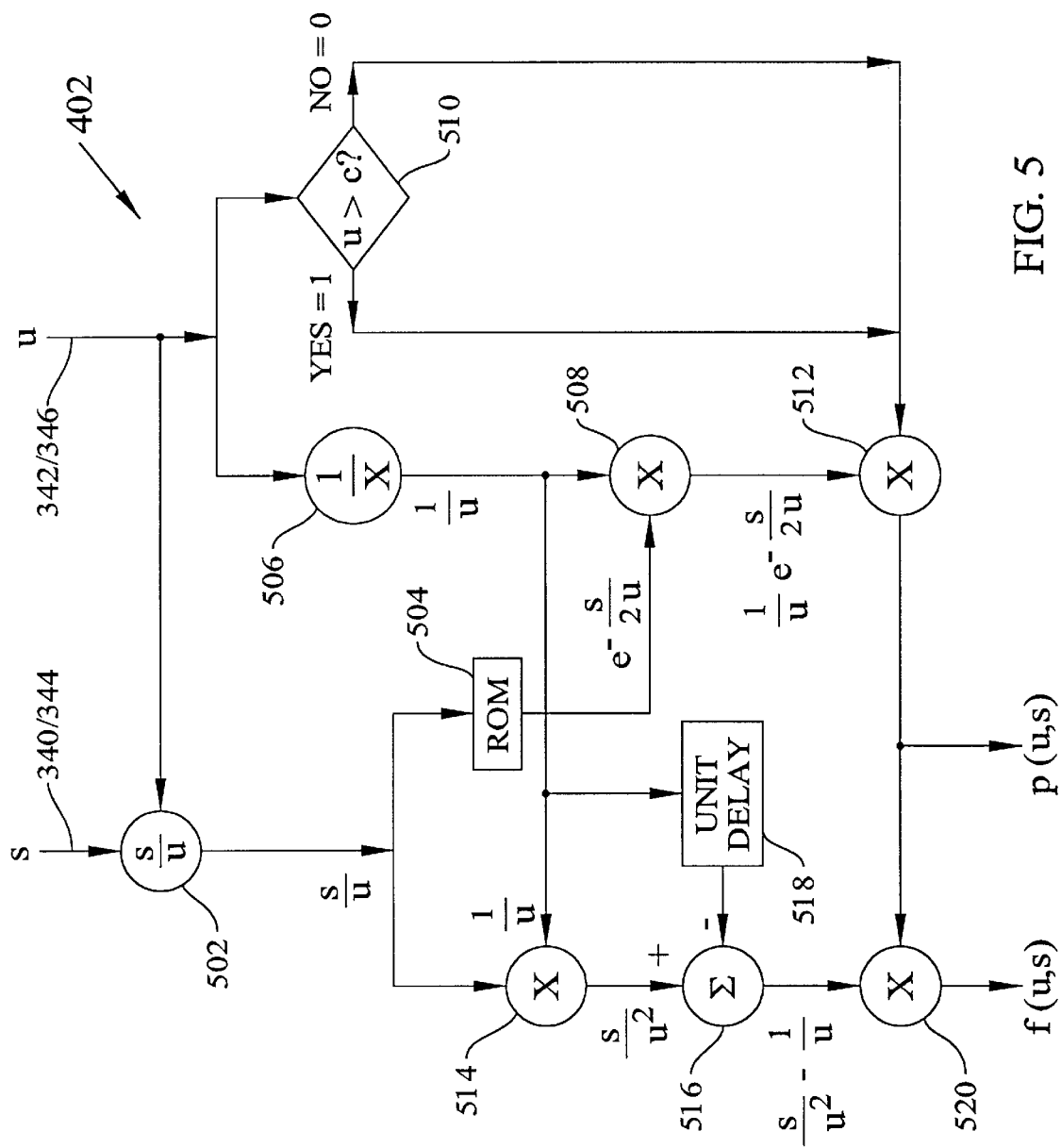
FIG. 5 is a detailed diagram of a kernel transform term calculator of the transform processor in FIG. 5.

FIG. 5 illustrates an example of one of transform term calculators 402. A transform term divider 502 inputs the s and u terms from scheduler 204 and outputs quotient $_u{}^s$ to a first multiplier 514 and a ROM 504. ROM 504 inputs quotient $_u{}^s$ as an address and outputs a corresponding table lookup value of $—_{2u}{}^s$ to a second multiplier 508. A reciprocal function 506 inputs u and outputs $_u{}^1$ to first multiplier 514, second multiplier 508, and a unit delay 518. Second multiplier 508 outputs the function p defined above.

The performance of the frequency domain kernel processor may be considerably improved if samples having too small a magnitude are excluded from the interference model. This may be accomplished by comparing each sample used to calculate the functions p and f with a threshold C. A nominal value for C is the 10 percentile value of the magnitudes of the interferer samples, i.e. C should be selected so that u≦C for 10 percent of samples u. A comparator 510 compares u with threshold C. If u is less than or equal to C, p is set to zero by a third multiplier 512. The resulting value for p is output to a fourth multiplier 520. First multiplier 514 outputs the product $_u{}^{2s}$ to sum function 516. Unit delay 518 outputs $_u{}^1$ after a unit delay to compensate for the delayed output from first multiplier 514. Sum function 516 outputs the sum of $_u{}^{2s}$ and delayed output $_u{}^1$ to a fourth multiplier 520. Fourth multiplier 520 outputs the function f defined above.

Each frequency excluding that of the lowest and the highest FFT bins are output to format processor 108 for display. For processing hydrophone signals, the Fourier transform length should be selected to match the bandwidth of the signal of interest. For communication receiver signals, M-ary frequency shift keyed (MFSK) signals may be decoded by determining which possible frequency combinations have the highest magnitude sums for each time interval during which a symbol is transmitted.

Figure 6:
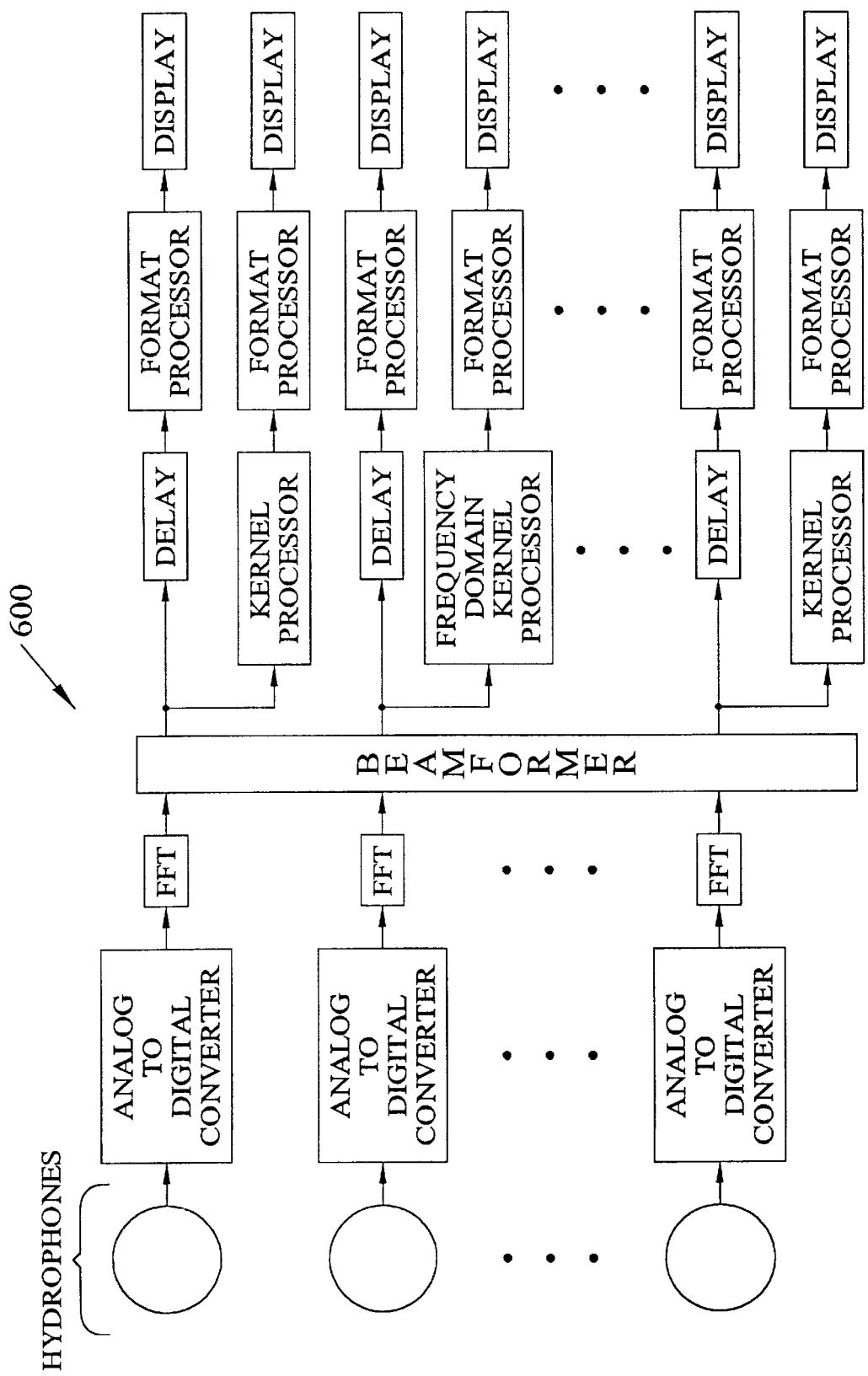
FIG. 6 is a block diagram of beamformer system incorporating multiple frequency domain kernel processors.

FIG. 6 is a block diagram of beamformer system incorporating multiple frequency domain kernel processors to enhance the signal of interest in each beam The enhanced signals may be displayed concurrently with the standard beam output spectral display as shown to preserve all the available information in the beamformed output. The digital hardware design in the example described above is suitable for large scale integration, which may be used to implement large hydrophone arrays as well as communication receivers at very high frequencies.

Other modifications, variations, and applications of the present invention may be made in accordance with the above teachings other than as specifically described to practice the invention within the scope of the following claims.

We claim:

1. A frequency domain kernel processor comprising:

a scheduler for selecting samples from blocks of Fourier transform coefficients of an input signal, squaring magnitudes of said samples, and outputting said squared magnitudes as serial terms and parallel terms;

and a transform processor coupled to said scheduler for calculating a transform from said serial terms and said parallel terms to generate a frequency domain series representative of said input signal wherein relative signal power from interfering signals is substantially reduced.

2. The frequency domain kernel processor of claim 1 wherein said transform processor comprises:

transform calculators for calculating output values p and f as functions of said serial terms and said parallel terms respectively;

a first sum calculator coupled to said transform calculators for calculating a sum of said p values;

a second sum calculator coupled to said transform calculators for calculating a sum of said f values;

and a divider coupled to said first sum calculator and to said second sum calculator for finding a quotient of said sum of said p values divided by said sum of said f values to form said frequency domain series.

3. The frequency domain kernel processor of claim 2 wherein said f values are calculated according to the formula $$f(u,s) = \left[\frac{s}{u^2} - \frac{2}{u}\right]\frac{1}{u}e^{-\frac{s}{2u}}$$

wherein s represents a magnitude squared of a selected Fourier coefficient for each of said serial terms;

and wherein u represents a magnitude squared of said selected Fourier coefficient for said parallel terms corresponding to each of said serial terms.

4. The frequency domain kernel processor of claim 3 wherein said p values are calculated according to the formula $$p(u,s) = \frac{1}{u}e^{-\frac{s}{2u}}.$$

5. The frequency domain kernel processor of claim 4 further including a format processor and a display coupled to said output buffer.

6. The frequency domain kernel processor of claim 1 further comprising an output buffer coupled to said transform processor.

7. The frequency domain kernel processor of claim 1 further comprising a Fourier transform and an A/D converter coupled to said scheduler.

* * * * *